US009046127B2

(12) United States Patent
Rao et al.

(10) Patent No.: US 9,046,127 B2
(45) Date of Patent: Jun. 2, 2015

(54) LEVER SHIFTER CONTROL CABLE ASSEMBLY

(71) Applicant: Suprajit Engineering Ltd., Bangalore, Karnataka (IN)

(72) Inventors: Subba Narahari Rao, Bangalore (IN); Basavaraj Ukanal, Bangalore (IN); Mukund Rao, Bangalore (IN)

(73) Assignee: Suprajit Engineering Ltd. (IN)

( * ) Notice: Subject to any disclaimer, the term of this patent is extended or adjusted under 35 U.S.C. 154(b) by 0 days.

(21) Appl. No.: 13/951,888

(22) Filed: Jul. 26, 2013

(65) Prior Publication Data

US 2014/0102241 A1    Apr. 17, 2014

(30) Foreign Application Priority Data

Oct. 17, 2012   (IN) .......................... 4338/CHE/2012

(51) Int. Cl.
*F16C 1/10*        (2006.01)
*F16C 1/12*        (2006.01)
*G05G 1/04*        (2006.01)

(52) U.S. Cl.
CPC ............. *F16C 1/12* (2013.01); *Y10T 74/20438* (2015.01); *F16C 2310/00* (2013.01); *G05G 1/04* (2013.01)

(58) Field of Classification Search
USPC .......... 74/473.1, 473.3, 501.6, 502.2; 440/86, 440/87; 56/10.8
See application file for complete search history.

(56) References Cited

U.S. PATENT DOCUMENTS

| | | | | |
|---|---|---|---|---|
| 4,119,186 A | * | 10/1978 | Choudhury et al. | 477/113 |
| 4,753,062 A | * | 6/1988 | Roelle | 56/10.5 |
| 5,637,022 A | * | 6/1997 | Koike et al. | 440/87 |
| 5,701,967 A | * | 12/1997 | Barnard | 180/19.3 |
| 6,070,487 A | | 6/2000 | Beugelsdyk | |
| 6,502,335 B2 | | 1/2003 | Prochnow | |
| 7,571,788 B2 | | 8/2009 | Barnard | |
| 7,591,126 B2 | | 9/2009 | Cox | |
| 7,938,039 B2 | | 5/2011 | Cox | |

* cited by examiner

*Primary Examiner* — Vicky Johnson
(74) *Attorney, Agent, or Firm* — Robert Plotkin, P.C.

(57) ABSTRACT

The assembly includes a casing having two halves defining a chamber there between and a lever shifter movably mounted between the two halves of the casing for pivotal movement, wherein the lever shifter configured for to and fro movement. The assembly has a roller-spring-sleeve unit operatively connected to the lever shifter for controlling the lever shifter. The assembly further has four numbers of snap fit units each comprising a flat spring configures into a U-shaped nylon molded part have been inserted into left and right covers to retain the casing to the panel. The assembly also has a cable assembly mounted on an abutment, wherein the abutment is housed within the casing by a snap fit and coupled to the lever shifter on one end and a control cable connected to the casing through the abutment through a hole in the casing on the other end.

9 Claims, 4 Drawing Sheets

LEVER SHIFTER CONTROL CABLE ASSEMBLY

PRIORITY CLAIM

This application claims priority from the Provisional Application Number 4338/CHE/2012 filed with Indian patent Office, Chennai on 17 Oct. 2012 entitled "LEVER SHIFTER CONTROL CABLE ASSEMBLY", the entirety of which is expressly incorporated herein by reference.

DESCRIPTION OF THE INVENTION

The following specification particularly describes the invention and the manner in which it is to be performed:

FIELD OF THE INVENTION

The present invention relates to functional, mounting and control mechanism on engine functions such as throttle, power take-off and the like when the engines are used in products such as lawn movers, tillers, snowmobiles and similar equipments. The invention relates more specifically to an assembly for controlling operation of a lever shifter cable in different equipments.

BACKGROUND OF THE INVENTION

Lever control cables are mostly used in variety of applications in order to remotely control the various mechanism of a machine such as power take-off, throttles, brakes, chokes and the like. The use of lever shifter control cables are well known in the field of devices such as lawn mower, snow mobile, tiller and the like. The presence of these lever shifter control cables enables the users to control the device much easily and efficiently. There are various methods that exist for fitting these lever shifter control cables to the machines.

The ability to provide a control cable assembly as a snap-in unit has developed as a desired option. There are many prior arts existing that disclose a lever shifter cable assembly that operates using a housing which substantially encloses a detent mechanism to which a shiftable lever is attached. However, these systems have several limitations such as causing sound disturbance and inconvenience for the persons using the lever shifter control cable assembly. The ability to give smooth functioning over a continuous operating range is restricted in case of the prior art due to the assembly limitations. Many of the already existing assembly create unwanted sound due to friction between metal parts especially while controlling the cable for various functions.

Hence there is a need for a mechanism that provides ease of assembly on to the panel and provides reliability of a lever shifter function to the engine in application such as lawn mower, snow mobiles, tiller and others.

SUMMARY OF THE INVENTION

According to an embodiment of the invention of an assembly for lever shifter cable control, the assembly includes a casing having two halves defining a chamber there between and a lever shifter movably mounted between the two halves of the casing for pivotal movement about a pivot axis, wherein the lever shifter configured for to and fro movement. The assembly has a roller-spring-sleeve unit operatively connected to the lever shifter, the roller-spring-sleeve unit is being housed in a receptacle in the casing for controlling the lever shifter. The roller-spring-sleeve unit includes a compression spring coupled to a lug and positioned in a vertical orientation. The lug is coupled to an inner wall of the casing. A sleeve is connected to the compression spring, wherein the sleeve has a dish shaped configuration and is configured to match with the lug. A roller is configured to be received by the sleeve. The assembly also has four numbers of snap fit units. Each snap fit unit comprising a flat spring configured into a U-shaped nylon mold part, a pocket to receive the flat spring, wherein the flat spring inserted in the pocket is configured to provide lock fit for the liver shifter cable control assembly to a panel. The lever shifter cable control assembly also has a control cable connected to the casing through an abutment through a hole in the casing, wherein the abutment is housed within the casing and coupled to the lever shifter.

The present invention provides ease of assembly on to the panel and reliability of the shifter function to the engine very efficiently in applications such as lawn mower, snow mobiles, tiller and other such devices.

BRIEF DESCRIPTION OF THE DRAWINGS

Drawings here indicate one of the applications of the invention pertaining to throttle control cable assembly of lawn mower with the clear understanding that the current invention is applicable to other control cable assemblies as well as other applications like tillers, snow mobiles and many more.

DETAILED DESCRIPTION

Reference will now be made in detail to the description of the present subject matter, one or more examples of which are shown in figures. Each example is provided to explain the subject matter and not a limitation. Various changes and modifications obvious to one skilled in the art to which the invention pertains are deemed to be within the spirit, scope and contemplation of the invention.

The present invention provides a cable control for a variety of applications to actuate a remote mechanism connected to a control cable. The control cable is capable of various control mechanism on engine functions such as throttle, power take-off and the like when the engines are used in equipments such as lawn movers, tillers, snowmobiles and similar equipments.

Figure 1:
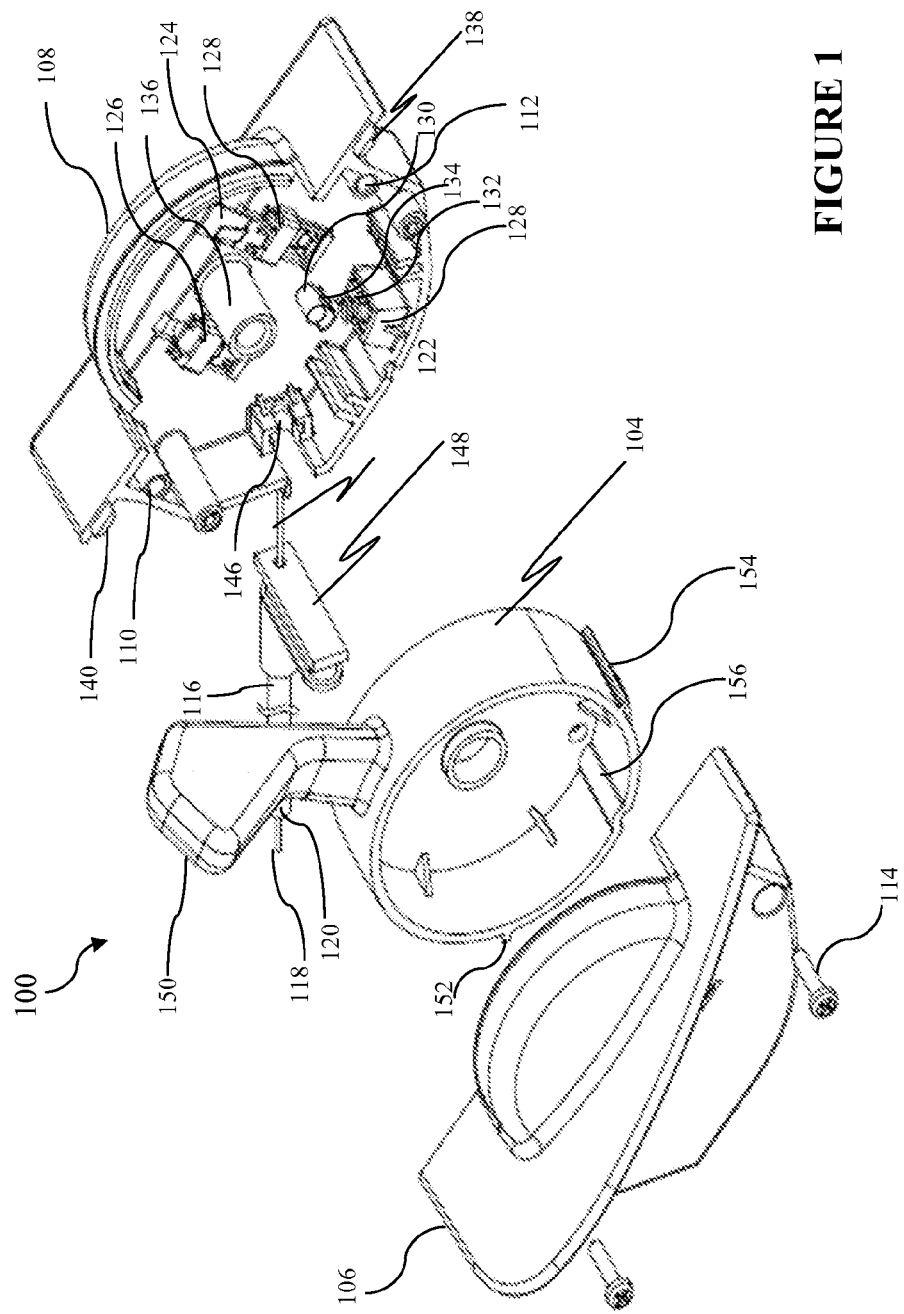
FIG. 1 shows an exploded view of lever shifter control cable assembly for single lever throttle cable.

FIG. 1 shows an exploded view of a lever shifter control cable assembly (100) (hereinafter referred to as cable assembly 100) according to one embodiment of the invention. The lever shifter control cable assembly (100) may be used in different equipments such as lawn movers, snowmobiles, snow blowers, tillers and other equipments. The cable assembly (100) shown to include single lever throttle cable. The cable assembly (100) as shown is exploded into three parts. One part is a lever shifter throttle (104) and other two parts are of a casing for holding and functioning of the cable assembly (100). The two parts or two halves of the casing include a cover (106) and a cover (108). The casing i.e. the cover (106) and the cover (108) are composed of a resin material. The cover (106) and the cover (108) may be injection molded using a resin material. The cover (108) includes a wall face of about 4 mm in thickness configured within the casing. The cover (108) is provided with two holes such as a hole (110) and a hole (112) on either side of diameter of the wall face. The two holes may have a length of about 4 mm. Two screws (114) are used to engage and assemble the cover (108) and the lever shifter throttle (104) with cover (106).

The two halves of the casing are connected by the lever shifter throttle (104). The shifting operation of the lever shifter throttle (104) is performed by means of a roller-spring-sleeve mechanism positioned in an inner portion of the casing. In an embodiment, the roller-spring-sleeve unit (200) is configured within a receptacle in the casing. The cable assembly (100) also includes a control cable (116) having a portion (118) moving inside a sheathed outer portion (120). In an embodiment the control cable (116) may be a Bowden cable. The control cable (116) is fixed to the casing through an abutment (122). The structure of the abutment (122) may be rectangular in shape. The free end of the control cable (116) connects to an engine through an applicator like throttle (not shown in FIG. 1). The throttle in turn controls the engine operation.

The cable assembly (100) is received by a slot in a control panel of equipment such as a lawn mower. In order to secure the cable assembly (100) to the control panel a snap fit unit (124) may be used. The snap fit unit (124) is configured in the two halves of the casing to enable compact fitting of the cable assembly (100) to the control panel. At the interior of the cover (106) and the cover (108), two pockets such as a pocket (126) and a pocket (128) are provided to engage a snap fit unit (124).

Thus, the cable assembly (100) with the three major portions such as the lever shifter throttle (104), the cover (106), the cover (108) along with the roller-spring-sleeve unit (200) and the snap fit unit (124) provides a reliable shifter function in applications such as lawn mower.

Figure 2:
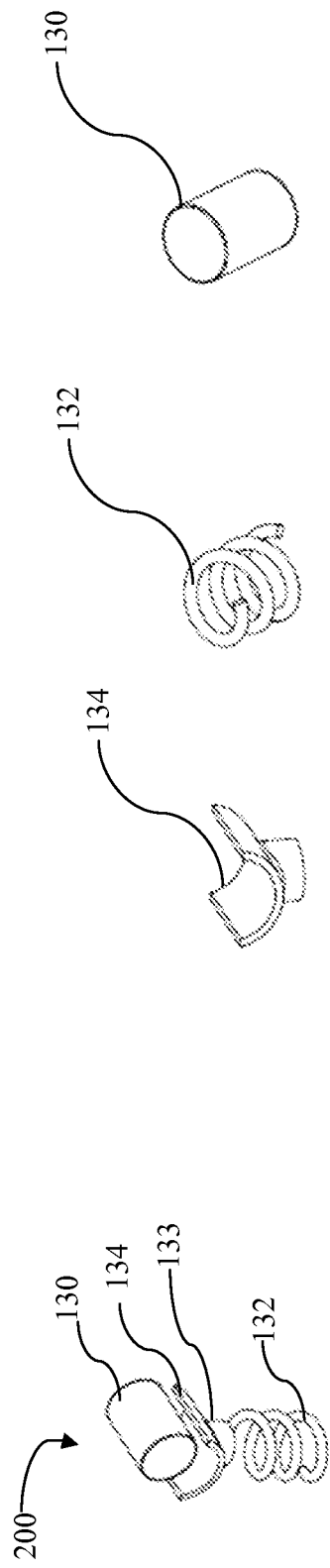
FIG. 2 shows child parts of a roller-spring-sleeve unit according to one embodiment of the invention.

The cover (106) and the cover (108) are provided with a housing having wall on all sides and a lug (131) at the bottom. The lug (131) in the cover (108) accommodates the roller-spring-sleeve unit (200). The roller-spring-sleeve unit (200) includes a roller (130), a spring (132) and a sleeve (134) as shown in FIG. 1 and FIG. 2. The cable assembly (100) also includes a shaft (136) that passes through the cover (108) and engages with the lever shifter throttle (104).

The cover (108) includes two-dove tail projections such as a projection (138) and a projection (140) that are configured on either extreme ends of the cover (108). The cover (106) includes dove-tail grooves (not shown in FIG. 1) which correspond in shape to the dove-tail projections on the cover (108). The holes (110) and (112) on the cover (108) may be self tapping screw recesses. The cover (106) includes two screw mounting holes for receiving self tapping screws (114) to the self-tapping screw recess (110,112) on the cover (108). The cover (106) and the cover (108) are slide interfitted using the dove-tail projections and dove tail grooves along with the self-tapping screws (114).

The cover (108) includes a housing (146) which engages with an abutment lever (148). The abutment lever (148) is connected to the control cable (116) with fitments along its length. The control cable (116) fitted on the housing (146) through the abutment lever (148) is hooked on the lever shifter throttle (104) through a hole. On operating the lever shifter throttle (104) the control cable (116) having other end fixed to a throttle of the engine operates thereby imparting speed to the engine.

The lever shifter throttle (104) is an injection molded part composing of a resin material. The lever shifter throttle (104) has a circular wall of thickness about 3 mm. The lever shifter throttle (104) also includes strengthening ribs and an extended lever unit (150) to be operated by a finger movement of a user. The lever shifter throttle (104), on engagement with the cover (108), rotates diametrically over an engaging shaft projection (136) of the right (108). Two lever stopper ribs such as a lever stopper rib (152) and a lever stopper rib (154) are provided on a wall of the lever shifter throttle (104) which is at a diametrical distance against each other to act as a stopper to restrict movement of the lever shifter throttle (104). A circular groove i.e. a roller locking groove (156) is provided as a detent for the lever shifter throttle (104) to stop at a mid position.

The lever shifter throttle (104) is mounted in between the two halves of the casing which pivots on a round cylindrical projection that engages with the shaft projection (136) and rolls on the wall radially. The casing is designed to house the lever shifter throttle (104), the roller-spring-sleeve unit (200) and the snap fit unit (124) to the outer profile which is contoured to accommodate two self-tapping screws to lock the two halves together along with the two dove-tail projections i.e. the projection (138) and the projection (140).

The Roller-Sprint-Sleeve Mechanism

According to one embodiment, the roller-spring-sleeve unit (200) includes the roller (130), the spring (132) and the sleeve (134). The roller-spring-sleeve unit (200) is a key sub-assembly which continuously engages the lever shifter throttle (104) with a predetermined thrust force acting diametrically. The thrust force is imparted through the spring (132) made of steel material and hardened and passivated to prevent rust. The spring (132) is a compression spring. The spring (132) is seated on the lug (131) on the housing provided in the cover (108). The sleeve lug (133) equal to the inside diameter of the spring (132) which prevents it from wobbling. The top of the spring (132) engages a sleeve (134). The sleeve (134) is composed of resin material. The sleeve (134) is shaped to receive the roller (130) having diameter preferably of at least 5 mm. The roller (130) is composed of a stainless steel material. The sleeve (134) prevents contact between the roller (130) and the spring (132) thereby avoiding metal to metal contact resulting in reduction of friction and noise. The bottom of sleeve (134) includes a sleeve lug of diameter equal to the inside diameter of the spring (132) thus engaging into it. Through the spring force, the roller (130) is always engaged with the lever shifter throttle (104). The roller locking groove (156) in the lever shifter throttle (104) abrupt the movement of a lever at a predetermined intermediate position called "the detent position". An additional force by a thumb-press overcomes the groove position thus moving the lever shifter throttle (104) to another end position. The end position is determined by the lever stopper ribs (152 and 154) on the wall of the lever shifter throttle (104).

FIG. 2 shows child parts of the roller-spring-sleeve unit (200) according to an embodiment. The roller-spring-sleeve unit (200) is housed in a receptacle with a lug (131). The lug (131) engages the inner diameter of the spring (132) and enables the spring (132) to stay in the position vertically at all times. The spring (132) receives the sleeve (134). The sleeve (134) may have a dish shape and matched into a pocket. The sleeve (134) may be injection molded and composed of a nylon resin material. The sleeve (134) serves the purpose of reducing noise, vibration and harshness. The sleeve (134) receives the roller (130) wherein the roller-spring-sleeve unit (200) is consistently engaged against the lever shifter throttle (104) by a predetermined force comfortable enough for the lever shifter throttle (104) to operate by a person. The roller (130) is composed of high chromium steel and hardened. The roller-spring-sleeve unit (200) rides against the wall of the lever shifter throttle (104) smoothly through the roller (130) and engages with the groove (156) provided on the lever shifter throttle (104) at a middle distance radially to accommodate the roller (130) with a "click sound" 'audible to confirm the engagement'.

The roller-spring-sleeve unit (200) on a gentle push of the lever further, disengages from the groove (156) and starts to ride on the wall of the lever shifter throttle (104) until it dead-stops against the boundary of the wall.

Figure 3:
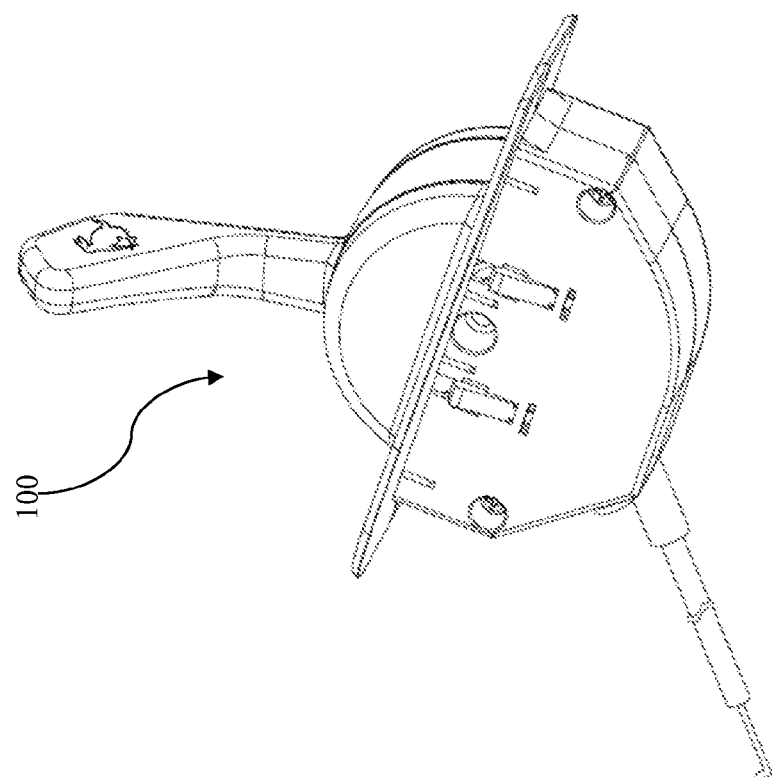
FIG. 3 shows a lever shifter control cable assembly (a single lever throttle cable) according to one embodiment of the invention.

FIG. 3 shows a lever shifter control cable assembly (300) including a single lever throttle cable (302) in accordance with an embodiment. The lever shifter control cable assembly (300) includes functional components similar to the cable assembly (100) and thus operates in the same manner. Hence the lever shifter control cable assembly (300) operates in the same manner as the cable assembly (100).

Figure 4:
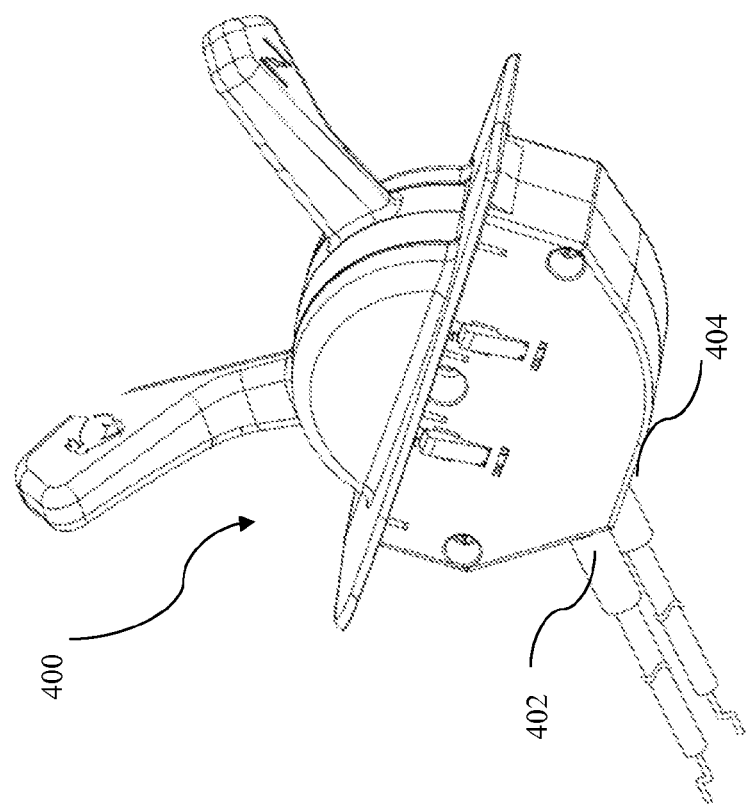
FIG. 4 shows a lever shifter control cable assembly (double lever throttle cable) according to one embodiment of the invention.

FIG. 4 shows a lever shifter control cable assembly (400) including two lever throttle cables such as a lever throttle cable (402) and a lever throttle cable (404) in accordance with an embodiment. The lever shifter control cable assembly (400) includes functional components similar to the cable assembly (100) and thus operates in the same manner. Hence the lever shifter control cable assembly (400) operates in the same manner as the cable assembly (100). In this embodiment the lever throttle cable (402) is used to operate choke position and the other lever throttle cable (404) operates throttle position. Further in this embodiment, there may be two sets of roller-spring-sleeve units positioned on a cover such as the cover (108). However the roller-spring-sleeve unit (200) remains same as the lever shifter control cable assembly (100).

Figure 5:
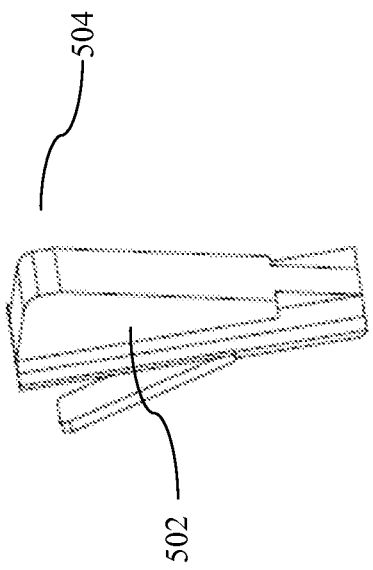
FIG. 5 shows child parts of snap fit unit according to one embodiment of the invention.
Figure 5:
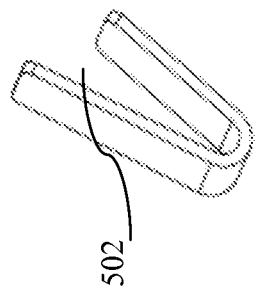

FIG. 5 shows child parts of a snap fit unit (124) according to an embodiment of the invention. The snap fit unit (124) includes a flat spring formed into a 'U' shaped insert (502). The flat spring may be composed of steel, and has a snap fit round surface (504) for snap fitting. The flat spring made insert (502) may be molded into a nylon outer case. The method of molding includes an injection molded technique. While performing molding a resin made portion is integrated with a stainless steel sheet metal shaped into a prong form to provide the necessary spring action. This molded part is inserted into a pocket (126,128) provided at the cover (108) and the cover (106). The snap fit unit (124), by its unique design, closes through the prongs when the cable assembly (100) is inserted into a panel slot. The snap fit unit (124), by its unique design, closes through the prongs when the cable assembly (100) is inserted into a panel slot and opens to fit after insertion.

The present invention provides ease of assembly on to the panel and reliability of the shifter function to the engine very efficiently in applications like lawn mower, snow mobiles, tiller & others.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intention to rely on the Doctrine of Equivalents to determine and assess the reasonably fair scope of their invention as pertains to any apparatus not materially departing from but outside the literal scope of the invention as set out in the following claims.

We claim:

1. An assembly for lever shifter cable control, the assembly comprising:
   a. a casing comprising two halves defining a chamber there between;
   b. a lever shifter movably mounted between the two halves of the casing for pivotal movement about a pivot axis, wherein the lever shifter configured for to and fro movement;
   c. a roller-spring-sleeve unit operatively connected to the lever shifter, the roller-spring-sleeve unit housed in a receptacle in the casing for controlling the lever shifter, wherein the roller-spring-sleeve unit comprises:
      a compression spring coupled to a lug and positioned in a vertical orientation;
      a sleeve connected to the compression spring, wherein the sleeve has a dish shaped configuration and configured to match with the lug; and
      a roller configured to be received by the sleeve;
   d. a snap fit unit comprising a flat spring configured into a U shaped nylon molded part, a pocket to receive the flat spring, wherein the flat spring inserted in the pocket is configured to provide a lock fit for the lever shifter cable control assembly to a panel; and
   f. a control cable connected to the casing through an abutment through a hole in the casing, wherein the abutment is housed within the casing and coupled to the lever shifter.

2. The assembly as claimed in claim 1, wherein the lever shifter movably mounted between the two halves of the casing pivots on a cylindrical projection and radially spins with respect to an inner wall of the casing.

3. The assembly as claimed in claim 1, wherein the casing has an inner wall, wherein the lever shifter, the roller-spring-sleeve unit and the snap fit unit are configured to the inner wall.

4. The assembly as claimed in claim 1, wherein the compression spring is composed of a nylon resin material.

5. The assembly as claimed in claim 1, wherein the roller is composed of high chromium steel.

6. The assembly as claimed in claim 1, wherein the roller-spring-sleeve unit is continuously and consistently connected to the lever shifter.

7. The assembly as claimed in claim 6, wherein the lever shifter further comprises a groove, wherein upon operating the lever shifter the roller-spring-sleeve unit rides against a wall of the lever shifter and the roller engages with the groove.

8. The assembly as claimed in claim 7, wherein the lever shifter is operated by a user.

9. The assembly as claimed in claim 8, wherein the lever shifter when operated the roller-spring-sleeve unit disengages from the groove and rides on the wall of lever shifter until stopping against a boundary of the wall.

\* \* \* \* \*